F. H. PETERSEN.
TOOL HOLDER.
APPLICATION FILED FEB. 18, 1920.
1,435,873.
Patented Nov. 14, 1922.
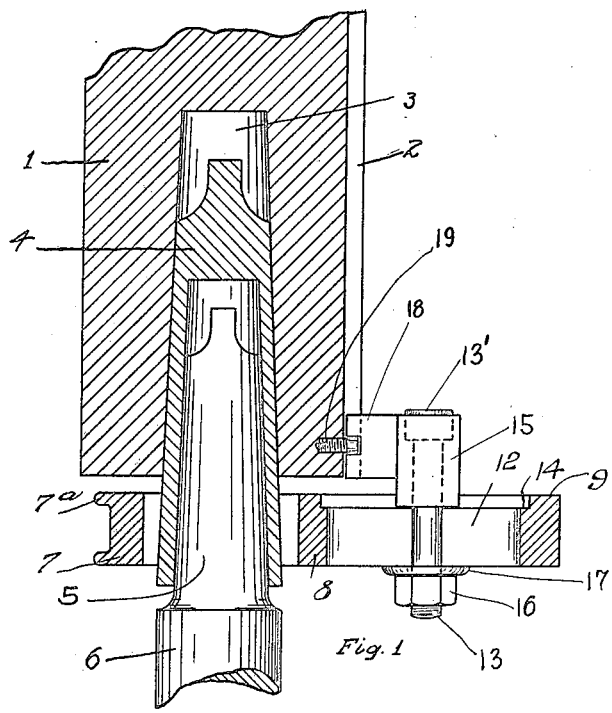
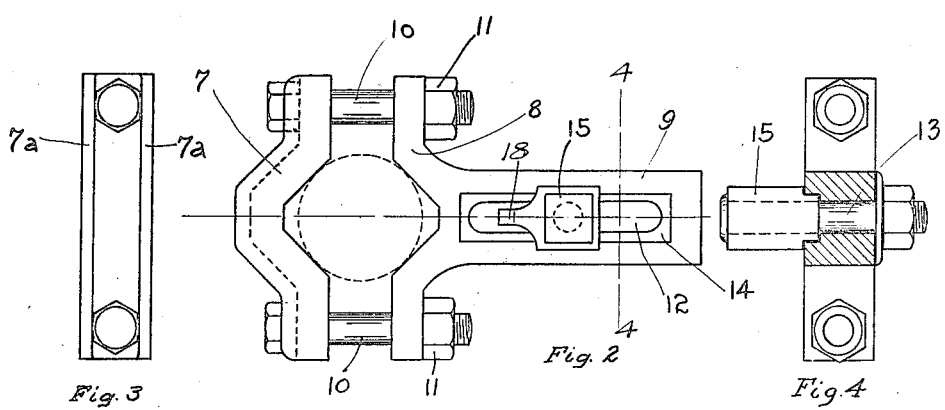
Frank H. Petersen, Inventor Patented Nov. 14, 1922.

1,435,873

UNITED STATES PATENT OFFICE.

FRANK H. PETERSEN, OF DENVER, COLORADO, ASSIGNOR, BY MESNE ASSIGNMENTS, OF ONE-HALF TO ALFRED L. WESTON, OF DENVER, COLORADO.

TOOL HOLDER.

Application filed February 18, 1920. Serial No. 359,580.

*To all whom it may concern:*

Be it known that I, FRANK H. PETERSEN, a citizen of the United States, residing at Denver, in the county of Denver and State of Colorado, have invented certain new and useful Improvements in Tool Holders; and I do hereby declare the following to be a full, clear, and exact description of the invention, such as will enable others skilled in the art to which it appertains to make and use the same.

This invention relates to means for preventing a tool, subject to torsional strain, from rotating in its socket. Although of broad utility I have found this invention especially useful when applied to a tool having a standard tapered shank socketed in the correspondingly tapered tail-center socket of the tail-stock spindle of an engine or other lathe.

It is customary in certain kinds of engine lathe work to remove the tail-center and seat a cutting tool, such as a drill, tap or reamer, in the taper socket from which the center was removed, which tool may be advanced by the tail-stock feed screw into a rotating work piece chucked or dogged to the head spindle. Although, when well seated, a conical shank of Morse or like standard taper will resist all torsional strains tending to turn it in a corresponding tapered socket, films of oil or particles of matter are sometimes permitted to get between the wall of the socket and the tapered shank and destroy the accuracy of fit to such an extent that heavy torsion will twist the shank more or less in the socket; furthermore a drill, tap or similar tool has a tendency to feed itself forward and thus loosen its seat in the socket and permit the tool to jump, or twist and catch again, or grind in the socket. When the shank turns in its socket under heavy torsional strains the socket becomes thereby marred. It will be apparent that the marring of the tool center socket injuriously affects a precision machine like an engine lathe, wherein it is highly essential that the tail center shall be absolutely true, and its point precisely in the axis of the head spindle. Hence, to prevent any jumping or twisting of a taper-shank tool socketed in the tail stock spindle in place of the lathe center, this invention contemplates locking the tool to the spindle in a manner positively to prevent it from rotating to any degree with respect thereto.

In the following description a preferred embodiment is described in detail, and is illustrated in the accompanying drawings in which:

Figure 1 is a central longitudinal section through the forward end of a tail stock spindle, and a tool holding clamp embodying my invention;

Figure 2 is an elevation of the tool holding clamp viewed from the right of Figure 1;

Figure 3 is a top plan view of the tool holding clamp, and

Figure 4 is a section in line 4—4 of Figure 2.

In the drawings like reference characters designate corresponding parts throughout the several views.

A tail spindle of usual form is indicated at 1. On the under side is shown a key-way 2 adapted to engage a spline or key carried on the tail stock of a lathe. In the end of the tail spindle 1 there is formed a taper socket 3 for the purpose of holding the tail center or a taper shank tool. In practice it will be understood that the spindle 1 may be advanced by a screw as is customary in engine or other lathes.

A taper shank tool may be fitted directly in the socket 3 or an adapting sleeve 4 may be used or any other form of adapting socket having a taper shank corresponding to the taper socket of the tail spindle.

The drawing shows a tool 6 having a taper shank 5 seated in the adapting sleeve 4 and it is to be understood that the taper shank 5 might equally well be fitted into the socket 3; but it is customary in socketing taper shank tools to provide different standard sizes and use adapters since in that way the size of the shank may be more efficiently adapted to the size of the tool.

In order to prevent the tool or the adapting sleeve or socket, as the case may be, which is seated in a taper socket 3 on the tail spindle, from slipping or jumping under any torsional strain applied to the working tool, a dog or analogous device is provided adapted to be secured to the tool or the adapting socket and be locked to the spindle so that no relative rotation may occur between the spindle and the part that is socketed in it. The device that I have shown for this purpose comprises a clamping member 7, and a clamping member 8, having a radial arm 9 extending therefrom. The clamping members 7 and 8 have opposing V-shaped grooves adapted to embrace an object held between them. Said clamping members are secured together and adapted to be drawn tightly toward each other by bolts 10 and nuts 11 threaded thereon. The outer side of the clamp member 7 is provided with a pair of parallel flanges 7ª, the distance apart of said flanges being exactly equal to the diameter of the hexagonal heads of the bolts 10 so that said bolts are prevented from rotating when the nuts 11 are tightened.

In order that the dog or analogous device may be utilized in connection with lathes having tail spindles of different diameters provision should be made whereby the means for locking the device to the spindle may be adjusted radially with respect to said spindle. In the embodiment illustrated, the radial arm 9 is provided with a radial slot 12 adapted to fit the shank of a bolt 13. A counter depression 14 is formed in one face of the arm 9 for the purpose of forming a steadying guide for the member 15, which is adapted to interlock with the key way 2 in the spindle 1.

The said member 15, which may be designated as a stop device or locking device, has a reduced inner end shaped to fit within the counter depression 14 and form a steadying guide while the member 15 is being adjusted longitudinally of the arm 9. The member 15 is bored to receive the said bolt 13 and has an angular countersink at one end of the bore in order to receive the head of the bolt 13 and prevent it from turning while being tightened. The head of the bolt is designated 13' and is illustrated in Figure 1 as seated in the angular countersink in the member 15. A nut 16 bearing upon a washer 17 is adapted to be rotated on the bolt 13 to tighten the same and secure the member 15 in a desired adjusted position. Projecting laterally from the member 15 in an axial direction with respect to the spindle 1 is a stop flange or interlocking key 18, the end of which is adapted to be seated in the key way 2 of the tail stock spindle, the side walls of said key way constituting a rigid means adapted to engage positively the key 18. The edge of the key 18 which engages the key way 2 is preferably notched or socketed transversely so as to receive a radial stud 19 in the key way 2 near its forward end. The drawing shows the stud 19 to consists of a threaded headless bolt tapped into the spindle 1 from the bottom of the key way 2.

The adjustability of the member 15 adapts the clamp to be applied to any standard lathe, the range of adjustment being sufficient to fit all market sizes. By providing the stud 19 engaging a notch in the key 18, the member that is socketed in the socket 3 on the spindle 1 is locked against endwise movement as well as against torsional movement, which is prevented by the sides of the key engaging the sides of the key way.

Although I have described this invention as applied to the tail spindle of a lathe, it will be obvious that it is of marked utility in all precision machines adapted to use a rotary tool, or a stationary tool with rotary work, so as to avoid marring and distortion of the taper sockets.

What I claim and desire to secure by Letters Patent is as follows:

1. A tool supporting spindle having a socket, a member fitting said socket, a dog adapted to engage said member so that said member cannot rotate with respect to said dog, cooperative locking devices on the outside of said spindle and on said dog adapted to prevent relative rotation between the dog and spindle, said locking means on the dog being radially movable so as to be adapted for spindles of different sizes.

2. A tool supporting spindle having a socket, a member fitting in said socket, a device non-rotatively secured to said member and having a radial arm, a locking device adjustable along said radial arm, and means on the spindle adapted to be engaged by said adjustable locking device and prevent relative rotation between said device secured to said member and said spindle.

3. A tool supporting spindle having a socket, a member fitting said socket, a device fixedly secured to said member and having a radial arm, a locking device adjustable along said radial arm, and a cooperating key and key way on said adjustable device and spindle adapted to prevent relative rotation between said fixedly secured device and spindle, and a stud in the key way adapted to engage a notch on said key.

4. A tool supporting spindle having a socket, a member fitting in said socket, a dog secured to said member in advance of the end of said spindle in such manner as to prevent relative rotary and longitudinal movement of the dog with respect to said member, said dog having a radially extending arm and a locking device projecting laterally from said radial arm, rigid means forming part of the spindle adapted positively to engage said locking device in such manner as to prevent rotation thereof with respect to the spindle, and a stud and socket slip-on connection adapted to be interlocked by radial movement of the locking device with respect to the spindle for preventing said dog from moving axially with respect to the spindle.

5. A tool holder comprising a clamp adapted to be secured to a tool or tool adapter, said clamp having a radial arm, a device adjustable along said arm, said adjustable device having a key adapted to engage a key way in a tool spindle.

In testimony whereof I affix my signature.

FRANK H. PETERSEN.